(12) United States Patent
Surtani

(10) Patent No.: US 9,092,335 B2
(45) Date of Patent: Jul. 28, 2015

(54) REPRESENTING A TREE STRUCTURE ON A FLAT STRUCTURE

(75) Inventor: Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 254 days.

(21) Appl. No.: 12/732,530

(22) Filed: Mar. 26, 2010

(65) Prior Publication Data

US 2011/0238916 A1 Sep. 29, 2011

(51) Int. Cl.
*G06F 12/00* (2006.01)
*G06F 13/00* (2006.01)
*G06F 13/28* (2006.01)
*G06F 12/08* (2006.01)
*G06F 17/30* (2006.01)

(52) U.S. Cl.
CPC ...... *G06F 12/0802* (2013.01); *G06F 17/30327* (2013.01)

(58) Field of Classification Search
None
See application file for complete search history.

(56) References Cited

U.S. PATENT DOCUMENTS

| 5,752,243 | A  | * | 5/1998  | Reiter et al.    | 1/1     |
|-----------|----|---|---------|------------------|---------|
| 5,787,430 | A  | * | 7/1998  | Doeringer et al. | 1/1     |
| 6,029,170 | A  | * | 2/2000  | Garger et al.    | 1/1     |
| 7,308,675 | B2 | * | 12/2007 | Motoyama et al.  | 717/106 |
| 7,730,101 | B2 | * | 6/2010  | Zhou et al.      | 707/797 |
| 2007/0174309 | A1 | * | 7/2007 | Pettovello    | 707/100 |
| 2009/0228514 | A1 | * | 9/2009 | Liu et al.    | 707/102 |
| 2009/0287660 | A1 | * | 11/2009 | Shinjo et al. | 707/3   |
| 2009/0307241 | A1 | * | 12/2009 | Schimunek et al. | 707/100 |

OTHER PUBLICATIONS

Surtani et al. JBoss Cache Users' Guide. Oct. 2008. http://docs.jboss.org/jbosscache/3.0.3.GA/userguide_en/html_single/index.html.*
Robert I. Pitts, Trie, BU CAS CS, archive.org date Mar. 21 2003, http://www.cs.bu.edu/teaching/c/tree/trie/.*

* cited by examiner

*Primary Examiner* — Yaima Rigol
(74) *Attorney, Agent, or Firm* — Lowenstein Sandler LLP

(57) ABSTRACT

An apparatus and a method for accessing data at a server node of a data grid system with distributed cache is described. The server receives a request to access a logical tree structure of cache nodes at a tree structure interface module of the server. The tree structure interface operates on a flat map structure of the cache nodes corresponding to the logical tree structure, transparent to the request. Each cache node is defined and operated on using a two-dimensional coordinate including a fully qualified name and a type.

9 Claims, 2 Drawing Sheets

REPRESENTING A TREE STRUCTURE ON A FLAT STRUCTURE

TECHNICAL FIELD

Embodiments of the present invention relate to computing systems, and more particularly, to networked memory.

BACKGROUND

Data grid offer ease of accessibility to data by exposing a simple data structure—a Cache—in which objects can be stored. In a distributed mode where caches cluster together, and a large memory heap can be exposed. This is more powerful than simple replication in that it distributes a fixed number of replicas of each entry—providing resilience to server failure—as well as scalability since the work done to store each entry is fixed in relation to cluster size.

Data is typically represented in a logical tree structure. However, operation on the tree structure can affect CPU and memory performance.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for accessing data at a server node of a data grid system with distributed cache is described. The server receives a request to access a logical tree structure of a cache nodes at a tree structure interface module of the server. The tree structure interface operates on a flat map structure of the cache nodes corresponding to the logical tree structure, transparent to the request. Each cache node is defined and operated on using a two-dimensional coordinate including a fully qualified name and a type.

Figure 1:
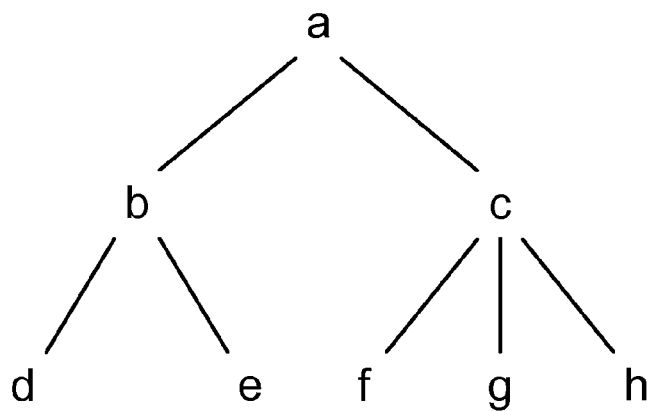
FIG. 1 is a block diagram illustrating one embodiment of a tree structure of cache nodes.

FIG. 1 is a block diagram illustrating one embodiment of a logical data tree structure of cache nodes of a data grid platform. A cache node is a simple data structure in which objects are stored. While the data grid platform can be run in local mode, its real value is in distributed mode where caches cluster together, and expose a large memory heap. This is more powerful than simple replication in that it distributes a fixed number of replicas of each entry—providing resilience to server failure—as well as scalability since the work done to store each entry is fixed in relation to cluster size.

The logical data tree structure includes a root node 'a' with children 'b' and 'c'. The particular location of a cache node is identified therefore in reference to each preceding cache node in the tree structure. For example, cache node f may be identified in a directory as follows "a/c/f".

Figure 2:
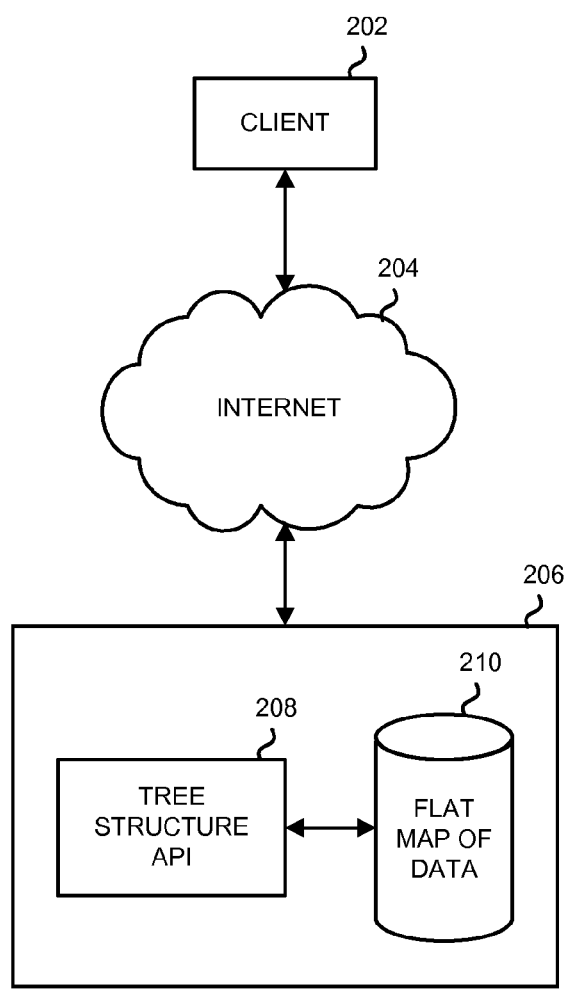
FIG. 2 is a block diagram illustrating one embodiment of a system for transparently representing a tree structure on a flat structure of data from cache nodes.

FIG. 2 is a block diagram illustrating one embodiment of a system for transparently representing a tree structure on a flat structure of data from cache nodes. A client 102 communicates a request to access the data grid in server 206 via a communication network 204 (e.g. the Internet). In one embodiment, client 102 includes a computing device configured to access the data from cache nodes stored in a logical tree structure manner. In other words, client 102 sees the cache nodes in a storage device 210 of server 206 as a logical data tree structure as previously illustrated in FIG. 1.

In one embodiment, server 206 includes a logical tree data structure API 208 coupled to storage device 210. Logical tree data structure API 208 is configured to receive a request to access a logical tree structure of the cache nodes in storage device 210 from client 202. Storage device 210 stores data from cache nodes in a flat map structure (e.g. two dimensional structure) for more efficient processing. Tree data structure API 208 transparently operates on the flat map structure of the cache nodes in storage device 210 corresponding to the logical tree structure from the request of client 202. In other words, by using this two-entry system per node, one can navigate a logical tree structure, find arbitrary nodes with O(1) complexity (one could not that with a "real" tree) and all of this complexity is hidden from the user by using a Tree facade (e.g. Tree structure interface API 208) so to the user, it looks and feels like a real tree structure even though the facade 208 translates the tree structure to this flat map structure and back.

In one embodiment, each cache node is defined and operated on using a two-entry-per-node system. Given a tree structure of nodes (a mathematical tree) where each node has a single parent and multiple attributes (key/value pairs), this is modeled using a structure called a NodeKey, which contains two elements.

The two elements are a fully qualified name (a "path" to the node) and a type. The type determines that the entry is either a data entry (containing the node's attributes) or a structural entry (containing pointers to the node's parent and all of the node's children).

In another embodiment, tree structure API operates/accesses the data in a flat map structure by computing a hash value associated with each node using the two-dimensional coordinate.

The following illustrates an example of a code for forming a NodeKey class:

```
package org.infinispan.tree;
import static org.infinispan.tree.NodeKey.Type.DATA;
import static org.infinispan.tree.NodeKey.Type.STRUCTURE;
import java.io.IOException;
import java.io.ObjectInput;
import java.io.ObjectOutput;
import org.infinispan.marshall.Ids;
import org.infinispan.marshall.Marshallable;
import org.infinispan.util.Util;
/**
 * A class that represents the key to a node
 *
 */
@Marshallable(externalizer = NodeKey.Externalizer.class, id = Ids.NODE_KEY)
public class NodeKey {
    final Fqn fqn;
    final Type contents;
    public static enum Type {
        DATA, STRUCTURE
    }
    public NodeKey(Fqn fqn, Type contents) {
        this.contents = contents;
        this.fqn = fqn;
    }
    public Fqn getFqn() {
        return fqn;
    }
```

-continued

```
    public Type getContents( ) {
        return contents;
    }
    public boolean equals(Object o) {
        if (this == o) return true;
        if (o == null || getClass( ) != o.getClass( )) return false;
        NodeKey key = (NodeKey) o;
        if (contents != key.contents) return false;
        if (!Util.safeEquals(fqn, key.fqn)) return false;
        return true;
    }
    public int hashCode( ) {
        int h = fqn != null ? fqn.hashCode( ) : 1;
        h += ~(h << 9);
        h ^= (h >>> 14);
        h += (h << 4);
        h ^= (h >>> 10);
        return h;
    }
    public String toString( ) {
        return "NodeKey{" +
                "contents=" + contents +
                ", fqn=" + fqn +
                '}';
    }
    public static class Externalizer implements
org.infinispan.marshall.Externalizer {
        private static final byte DATA_BYTE = 1;
        private static final byte STRUCTURE_BYTE = 2;
        public void writeObject(ObjectOutput output, Object object)
        throws IOException {
            NodeKey key = (NodeKey) object;
            output.writeObject(key.fqn);
            byte type = 0;
            switch (key.contents) {
                case DATA:
                    type = DATA_BYTE;
                    break;
                case STRUCTURE:
                    type = STRUCTURE_BYTE;
                    break;
            }
            output.write(type);
        }
        public Object readObject(ObjectInput input) throws
IOException, ClassNotFoundException {
            Fqn fqn = (Fqn) input.readObject( );
            int typeb = input.readUnsignedByte( );
            NodeKey.Type type = null;
            switch (typeb) {
                case DATA_BYTE:
                    type = DATA;
                    break;
                case STRUCTURE_BYTE:
                    type = STRUCTURE;
                    break;
            }
            return new NodeKey(fqn, type);
        }
    }
}
```

Server 206 is an example of a computing system configured to represent a tree structure on a flat structure of cache nodes. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 206 includes a processing device, a storage device 210, and a tree structure interface API 208.

Processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute the operations and steps discussed herein. In one embodiment, the modules may be include hardware or software or a combination of both.

The computer system 206 may further include a network interface device. While the computer-accessible storage medium 210 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 3:
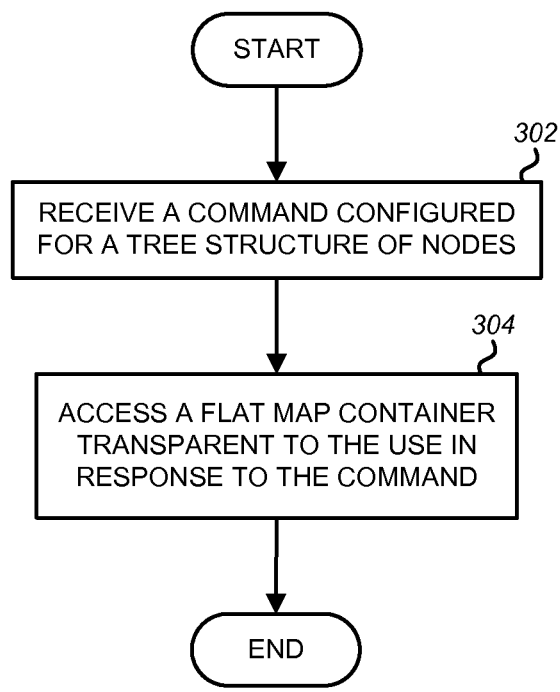
FIG. 3 is a flow diagram illustrating one embodiment of a method for transparently representing a tree structure on a flat structure of data from cache nodes.

FIG. 3 is a flow diagram illustrating one embodiment of a method for transparently representing a tree structure on a flat structure of data from cache nodes. At 302, a server receive a request to access a logical tree structure of a cache nodes at a tree structure interface module of the server. At 304, a flat map structure of the cache nodes corresponding to the logical tree structure is accessed on in response to the request. The access to the flat map structure is transparent to the request. In one embodiment, each cache node is defined and operated on using a two-dimensional coordinate including a fully qualified name and a type.

A two-dimensional coordinate attribute is associated with each cache node. In one embodiment, the two-dimensional coordinate attribute include a NodeKey. The fully qualified name includes a path to a cache node on the logical tree structure. The type includes a data entry containing a cache node attribute or a structural entry containing pointers to a cache node's parent and all of the cache node's children.

In one embodiment, a hash value associated with each node is computed using the two-dimensional coordinate. The flat map structure is accessed using the hash values of the corresponding cache nodes.

In one embodiment, the logical tree structure includes a plurality of cache nodes organized in a tree structure underneath a root cache node. Each cache node contains a key attribute and a value attribute of data.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

storing a flat map structure that corresponds to a plurality of cache nodes in a logical tree structure distributed in a data grid system, wherein the data grid system comprises a plurality of storage devices at a plurality of servers, wherein each of the plurality of cache nodes below a root node in the logical tree structure has one parent node and is configurable to have zero or more child nodes, wherein each of the plurality of cache nodes stores multiple attributes, wherein the flat map structure comprises a plurality of pairs of entries, wherein each cache node in the plurality of cache nodes corresponds to a pair of entries in the plurality of pairs of entries, wherein each entry in the pair of entries comprises a type and a fully qualified name, wherein the fully qualified name comprises a path to the cache node within the logical tree structure, wherein the type identifies a first one of the pair of entries as a data entry and a second one of the pair of entries as a structural entry, wherein the data entry stores a key and value pair for each of the multiple attributes of the cache node, and wherein the structural entry stores one or more pointers to the parent node and the zero or more child nodes of the cache node;

receiving a request to access at least one cache node in the plurality of cache nodes using the logical tree structure; and in response to receiving the request and transparent to the logical tree structure of the request, accessing, by a processing device, at least one pair of entries in the plurality of pairs of entries in the flat map structure corresponding to the at least one cache node in the logical tree structure of the request using a hash value of the fully qualified name of the at least one cache node corresponding to the at least one pair of entries.

2. The method of claim 1 further comprising:

associating a two-dimensional coordinate in the flat map with each cache node in the plurality of cache nodes, wherein the two-dimensional coordinate in the flat map comprises an entry from the plurality of pairs of entries.

3. The method of claim 1 wherein the fully qualified name of each entry in the plurality of pairs of entries is stored in the flat map structure as the hash value to access the entry within the flat map structure.

4. A non-transitory computer-readable storage medium having instructions stored therein that, when executed by a processing device, cause the processing device to:

store a flat map structure that corresponds to a plurality of cache nodes in a logical tree structure distributed in a data grid system, wherein the data grid system comprises a plurality of storage devices at a plurality of servers, wherein each of the plurality of cache nodes below a root node in the logical tree structure has one parent node and is configurable to have zero or more child nodes, wherein each of the plurality of cache nodes stores multiple attributes, wherein the flat map structure comprises a plurality of pairs of entries, wherein each cache node in the plurality of cache nodes corresponds to a pair of entries in the plurality of pairs of entries, wherein each entry in the pair of entries comprises a type and a fully qualified name, wherein the fully qualified name comprises a path to the cache node within the logical tree structure, wherein the type identifies a first one of the pair of entries as a data entry and a second one of the pair of entries as a structural entry, wherein the data entry stores a key and value pair for each of the multiple attributes of the cache node, and wherein the structural entry stores one or more pointers to the parent node and the zero or more child nodes of the cache node;

receive a request to access at least one cache node in the plurality of cache nodes using the logical tree structure; and in response to the receipt of the request and transparent to the logical tree structure of the request, access, by the processing device, at least one pair of entries in the plurality of pairs of entries in the flat map structure corresponding to the at least one cache node in the logical tree structure of the request using a hash value of the fully qualified name of the at least one cache node corresponding to the at least one pair of entries.

5. The non-transitory computer-readable storage medium of claim 4 wherein the processing device is further to:

associate a two-dimensional coordinate in the flat map with each cache node in the plurality of cache nodes, wherein the two-dimensional coordinate in the flat map comprises an entry from the plurality of pairs of entries.

6. The non-transitory computer-readable storage medium of claim 4, wherein the fully qualified name of each entry in the plurality of pairs of entries is stored in the flat map structure as the hash value to access the entry within the flat map structure.

7. A computer system comprising:

a storage device to store a flat map structure that corresponds to a plurality of cache nodes in a logical tree structure distributed in a data grid system, wherein the data grid system comprises a plurality of storage devices at a plurality of servers, wherein each of the plurality of cache nodes below a root node in the logical tree structure has one parent node and is configurable to have zero or more child nodes, wherein each of the plurality of cache nodes stores multiple attributes, wherein the flat map structure comprises a plurality of pairs of entries, wherein each cache node in the plurality of cache nodes corresponds to a pair of entries in the plurality of pairs of entries, wherein each entry in the pair of entries comprises a type and a fully qualified name, wherein the fully qualified name comprises a path to the cache node within the logical tree structure, wherein the type identifies a first one of the pair of entries as a data entry and a second one of the pair of entries as a structural entry, wherein the data entry stores a key and value pair for each of the multiple attributes of the cache node, and wherein the structural entry stores one or more pointers to the parent node and the zero or more child nodes of the cache node;

an interface to receive a request to access at least one cache node in the plurality of cache nodes using the logical tree structure; and a processing device operatively coupled to and to communicate with the storage device and the interface to, in response to the receipt of the request and transparent to the logical tree structure of the request, access at least one pair of entries in the plurality of pairs of entries in the flat map structure corresponding to the at least one cache node in the logical tree structure of the request using a hash value of the fully qualified name of the at least one cache node corresponding to the at least one pair of entries.

8. The computer system of claim 7, wherein the processing device is further to associate a two-dimensional coordinate in the flat map with each cache node in the plurality of cache nodes, wherein the two-dimensional coordinate in the flat map comprises an entry from the plurality of pairs of entries.

9. The computer system of claim 7, wherein the fully qualified name of each entry in the plurality of pairs of entries is stored in the flat map structure as the hash value to access the entry within the flat map structure.

* * * * *